(12) United States Patent
Uneme (10) Patent No.: US 10,790,730 B2
(45) Date of Patent: Sep. 29, 2020

(54) POWER CONVERSION DEVICE

(71) Applicant: HONDA MOTOR CO., LTD., Minato-ku, Tokyo (JP)

(72) Inventor: Takahiro Uneme, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/162,426

(22) Filed: Oct. 17, 2018

(65) Prior Publication Data
US 2019/0123622 A1    Apr. 25, 2019

(30) Foreign Application Priority Data

Oct. 19, 2017 (JP) ................................ 2017-202663

(51) Int. Cl.
*H02K 11/33* (2016.01)
*H02K 11/04* (2016.01)
(Continued)

(52) U.S. Cl.
CPC ............. *H02K 11/33* (2016.01); *H02J 7/24* (2013.01); *H02K 7/006* (2013.01); *H02K 11/25* (2016.01);
(Continued)

(58) Field of Classification Search
CPC ............ H02K 11/33; H02K 11/04; H02P 3/00
See application file for complete search history.

(56) References Cited

U.S. PATENT DOCUMENTS

2006/0086981 A1* 4/2006 Yamaguchi ........... H02M 7/003
257/347
2009/0206709 A1  8/2009 Kakuda et al.
(Continued)

FOREIGN PATENT DOCUMENTS

CN    101300725    11/2008
CN    103931086    7/2014
(Continued)

OTHER PUBLICATIONS

Japanese Decision to Grant a Patent for Japanese Patent Application No. 2017-202663 dated Feb. 8, 2019.
(Continued)

*Primary Examiner* — Cortez M Cook
(74) *Attorney, Agent, or Firm* — Amin, Turocy & Watson, LLP (57) ABSTRACT

A power conversion device includes a first power conversion circuit portion and a second power conversion circuit portion delivering power to and from first and second motors of which shaft centers are disposed along a first direction, three first connection terminals connecting the first power conversion circuit portion and the first motor, and three second connection terminals connecting the second power conversion circuit portion and the second motor. The first power conversion circuit portion and the second power conversion circuit portion are configured such that, when seen in radial directions of the first motor and the second motor, at least a portion thereof overlaps at least any of the first motor and the second motor. Three first connection terminals are disposed along the first direction on one side in a second direction. Three second connection terminals are disposed along the first direction on the other side in the second direction.

4 Claims, 7 Drawing Sheets

(51) Int. Cl.
  *H02P 3/00*   (2006.01)
  *H02K 11/25*  (2016.01)
  *H02P 25/30*  (2006.01)
  *H02P 6/04*   (2016.01)
  *H02J 7/24*   (2006.01)
  *H02K 7/00*   (2006.01)
  *H02P 27/06*  (2006.01)
  *H02K 11/27*  (2016.01)

(52) U.S. Cl.
  CPC .............. *H02P 6/04* (2013.01); *H02P 25/30* (2013.01); *H02P 27/06* (2013.01); *H02K 11/27* (2016.01); *H02P 2209/05* (2013.01)

(56) References Cited

U.S. PATENT DOCUMENTS

2010/0072865 A1* 3/2010 Endo .................. B60K 6/26
                                                  310/68 D
2016/0218602 A1* 7/2016 Fukushima ............ H02K 16/00

FOREIGN PATENT DOCUMENTS

| JP | 2003-339102 | 11/2003 |
| JP | 2007-099121 | 4/2007 |
| JP | 2015-079819 | 4/2015 |
| JP | 2015-089245 | 5/2015 |
| JP | 2016-140198 | 8/2016 |

OTHER PUBLICATIONS

Chinese Office Action for Chinese Patent Application No. 201811206049.7 dated Sep. 25, 2019.

* cited by examiner

POWER CONVERSION DEVICE

CROSS-REFERENCE TO RELATED APPLICATION

Priority is claimed on Japanese Patent Application No. 2017-202663, filed Oct. 19, 2017, the content of which is incorporated herein by reference.

BACKGROUND OF THE INVENTION

Field of the Invention

The present invention relates to a power conversion device.

Description of Related Art

Hitherto, a control unit including two three-phase connectors that connect two three-phase AC motor and two inverter circuits has become known (see, for example, Japanese Unexamined Patent Application, First Publication No. 2016-140198). For example, in a control unit 100 shown in FIG. 8, a first three-phase connector 101 and a second three-phase connector 102 are disposed side by side in a first direction D1. In the first three-phase connector 101, three-phase connection terminals 101U, 101V, and 101W are disposed side by side in the first direction D1. In the second three-phase connector 102, three-phase connection terminals 102U, 102V, and 102W are disposed side by side in the first direction D1.

Figure 9:
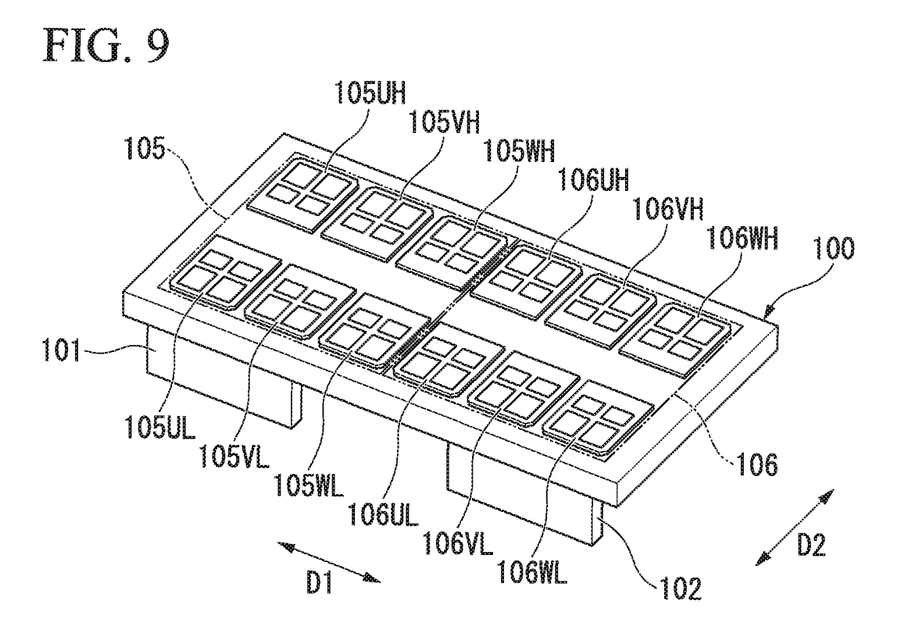
FIG. 9 is a perspective view of the control unit according to the related art.

For example, in the control unit 100 shown in FIG. 9, two inverter circuits (first inverter circuit 105 and the second inverter circuit 106) are disposed side by side in the first direction D1 (see, for example Japanese Unexamined Patent Application, First Publication No. 2015-079819). Three upper-arm circuit element portions 105UH, 105VH, and 105WH corresponding to three phases in the first inverter circuit 105 and three upper-arm circuit element portions 106UH, 106VH, and 106WH corresponding to three phases in the second inverter circuit 106 are disposed in a row in the first direction D1. Three lower-arm circuit element portions 105UL, 105VL, and 105WL corresponding to three phases in the first inverter circuit 105 and three lower-arm circuit element portions 106UL, 106VL, and 106WL corresponding to three phases in the second inverter circuit 106 are disposed in a row in the first direction D1. In each phase of the first inverter circuit 105 and the second inverter circuit 106, the upper-arm circuit element portions and the lower-arm circuit element portions are disposed opposite to each other in a second direction D2 orthogonal to the first direction D1.

SUMMARY OF THE INVENTION

Figure 8:
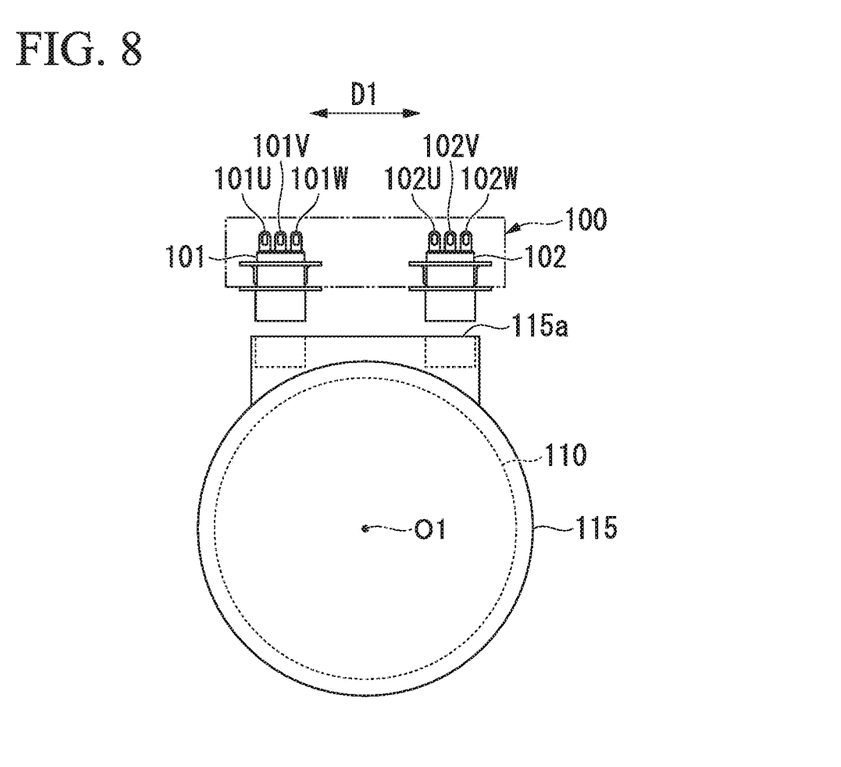
FIG. 8 is a side view schematically illustrating a control unit and a motor case according to the related art from a shaft center direction.

According to the control unit 100 in the related art shown in FIG. 8, in a case where the control unit 100 is mounted in a motor case 115 or the like having two motors (only one motor 110 is shown in FIG. 8) received therein, there may be a concern of space efficiency lowering. For example, in a case where the first direction D1 in which two three-phase connectors 101 and 102 are lined up and the direction of a shaft center O1 of the rotary shaft of two motors 110 are arranged so as to be orthogonal to each other, there is the possibility of an increase in a space required for avoiding interference between each of the three-phase connectors 101 and 102 and each motor 110 or the motor case 115. That is, each of the three-phase connectors 101 and 102 is larger in width in the first direction D1 parallel to the orthogonal direction of the shaft center O1 than a thickness in a direction parallel to the direction of the shaft center O1 of the motor 110. Therefore, it is difficult to dispose each of the three-phase connectors 101 and 102 in a space occurring between a mounting surface 115a of the control unit 100 in the motor case 115 and the outer circumferential portion of each motor 110.

On the other hand, in a case where the first direction D1 in which two three-phase connectors 101 and 102 are lined up and the direction of the shaft center O1 of two motors are made parallel to each other, the length of the entirety of the two three-phase connectors 101 and 102 in the first direction D1 becomes larger than the thickness of the two motors in the direction of the shaft center O1, and thus there may be a concern of the two three-phase connectors 101 and 102 protruding from the thickness of the two motors.

In the above-described problem, for example, even in a case where the two three-phase connectors 101 and 102 are disposed shifted aside in the second direction D2 orthogonal to the first direction D1 without being lined up in the first direction D1, there may be a concern of not being able to improve space efficiency.

An aspect of the present invention is contrived in view of such circumstances, and an object thereof is to provide a power conversion device which makes it possible to improve space efficiency when mounted in other instruments.

In order to solve the above problem and achieve such an object, the present invention adopts the following aspects.

(1) According to an aspect of the present invention, there is provided a power conversion device including: a first power conversion circuit and a second power conversion circuit that deliver power to and from a first motor and a second motor, respectively, of which shaft centers are disposed along a first direction; a plurality of first connection terminals that connect the first power conversion circuit and the first motor; and a plurality of second connection terminals that connect the second power conversion circuit and the second motor, wherein the first power conversion circuit and the second power conversion circuit are configured such that, when seen in radial directions of the first motor and the second motor, at least a portion of the first power conversion circuit and the second power conversion circuit is disposed at a position overlapping at least any of the first motor and the second motor, when seen in the radial directions of the first motor and the second motor, the plurality of first connection terminals are disposed side by side along the first direction on one side in a second direction orthogonal to the shaft center, and when seen in the radial directions of the first motor and the second motor, the plurality of second connection terminals are disposed side by side along the first direction on the other side in the second direction orthogonal to the shaft center.

(2) In the above (1), the first power conversion circuit may include a plurality of first element arrays in which element arrays composed of a high side arm element and a low side arm element delivering power to and from the first motor are lined up in the first direction according to a plurality of phases of the first motor, the second power conversion circuit may include a plurality of second element arrays in which element arrays composed of high side arm elements and low side arm elements delivering power to and from the second motor are lined up in the first direction according to a plurality of phases of the second motor, the plurality of first element arrays and the plurality of second element arrays may be disposed at positions facing each other in a second direction orthogonal to the first direction, input and output terminals of the plurality of first element arrays may be extracted to a side opposite to the plurality of second element arrays in the second direction, and input and output terminals of the plurality of second element arrays may be extracted to a side opposite to the plurality of first element arrays in the second direction.

(3) In the above (1) or (2), the power conversion device may further include: a capacitor connected to positive electrode terminals and negative electrode terminals of the plurality of first element arrays and the plurality of second element arrays; a positive electrode bus bar which extends in the first direction between the plurality of first element arrays and the plurality of second element arrays and to which the positive electrode terminals of the plurality of first element arrays and the plurality of second element arrays are connected; and a negative electrode bus bar which extends in the first direction between the plurality of first element arrays and the plurality of second element arrays and to which the negative electrode terminals of the plurality of first element arrays and the plurality of second element arrays are connected.

(4) In any one of the above (1) to (3), the power conversion device may further include a voltage converter which is electrically connected to at least any of the plurality of first element arrays and the plurality of second element arrays, first elements of high side arm elements and low side arm elements configuring the voltage converter may be disposed side by side next to the plurality of first element arrays in the first direction, and second elements of high side arm elements and low side arm elements configuring the voltage converter may be disposed side by side next to the plurality of second element arrays in the first direction.

According to the above (1), at least a portion of the first power conversion circuit and the second power conversion circuit overlaps at least any of the first motor and the second motor when seen in the radial direction of each motor, and thus it is possible to suppress an increase in the entire size of the power conversion device and the first and second motors.

In addition, a plurality of first connection terminals and a plurality of second connection terminals are disposed side by side along the first direction, on one side and the other side in the second direction orthogonal to the shaft center of each motor. Thereby, for example, as compared with a case where the plurality of first connection terminals and the plurality of second connection terminals are disposed side by side parallel to a direction or the like intersecting the shaft center of each motor, it is possible to improve space efficiency.

In a case of the above (2), a plurality of first element arrays disposed side by side in a row and a plurality of second element arrays disposed side by side in a row are disposed opposite to each other in the second direction. Therefore, while suppressing an increase in the length of connection to each input and output terminal, at least portions of each input and output terminal can be disposed so as to overlap each other when seen from the second direction.

Therefore, in a case where the power conversion device is mounted in the motor case or the like having the first motor and the second motor received therein, it is possible to suppress an increase in a space required for avoiding interference between the power conversion device and each motor or the motor case, and to suppress an increase in the entire size of the power conversion device and each motor.

In a case of the above (3), while preventing the positive electrode bus bar and the negative electrode bus bar from lengthening, it is possible to communize the positive electrode bus bar and the negative electrode bus bar in a plurality of first element arrays, a plurality of second element arrays, and the capacitor. Thereby, while suppressing an increase in the size of the power conversion device, it is possible to suppress an increase in the inductance of the positive electrode bus bar and the negative electrode bus bar.

In a case of the above (4), even in a case where the voltage converter is included, it is possible to suppress an increase in the entire size of the power conversion device and the first and second motors.

DETAILED DESCRIPTION OF THE INVENTION

Hereinafter, an embodiment of a power conversion device of the present invention will be described with reference to the accompanying drawings.

The power conversion device according to the present embodiment controls power deliver between a motor and a battery. For example, the power conversion device is mounted in an electromotive vehicle. The electromotive vehicle is an electric automobile, a hybrid vehicle, a fuel cell vehicle, or the like. The electric automobile is driven using a battery as a motive power source. The hybrid vehicle is driven using a battery and an internal-combustion engine as a motive power source. The fuel cell vehicle is driven using a fuel cell as a driving source.

<Vehicle>

Figure 1:
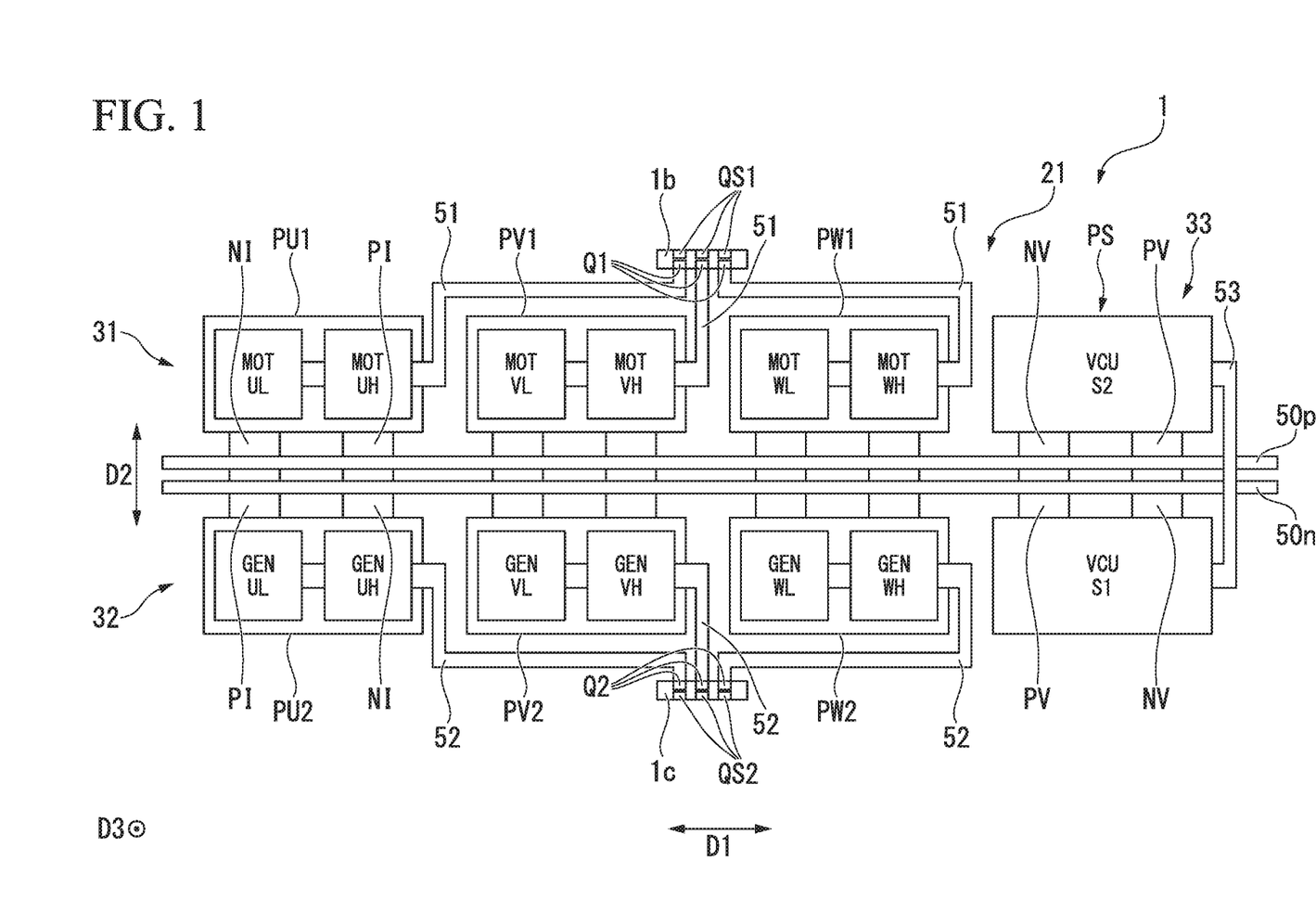
FIG. 1 is a plan view schematically illustrating a configuration of a power conversion device according to an embodiment of the present invention.

FIG. 1 is a plan view schematically illustrating a configuration of a power conversion device 1 according to an embodiment of the present invention.

Figure 2:
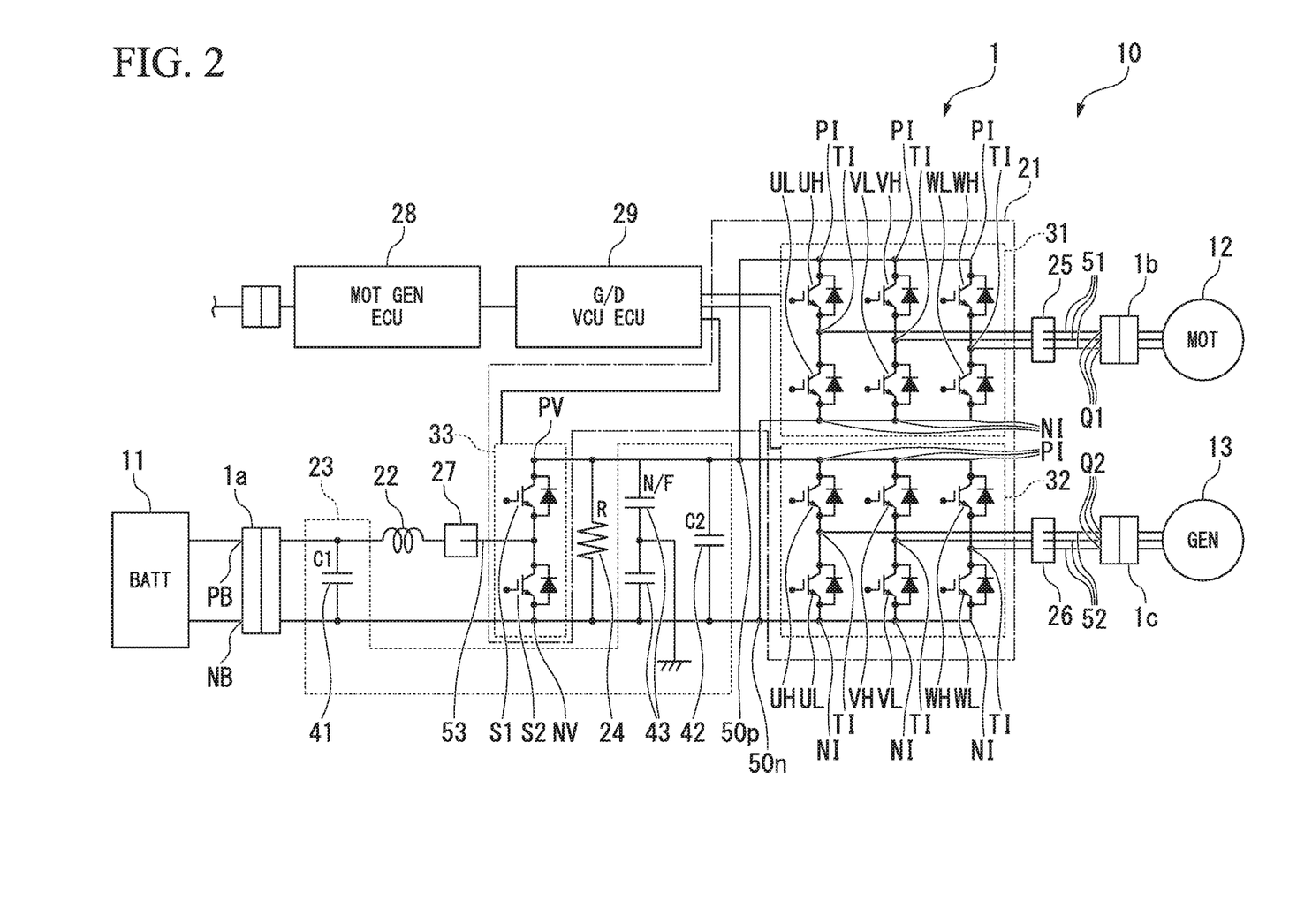
FIG. 2 is a diagram illustrating a configuration of a portion of a vehicle in which the power conversion device according to the embodiment of the present invention is mounted.

FIG. 2 is a diagram illustrating a configuration of a portion of a vehicle 10 in which the power conversion device 1 according to the embodiment of the present invention is mounted.

As shown in FIG. 2, the vehicle 10 includes a battery 11 (BATT), a first motor 12 (MOT) for traveling driving, and a second motor 13 (GEN) for power generation, in addition to the power conversion device 1.

The battery 11 includes a battery case and a plurality of battery modules received within the battery case. The battery module includes a plurality of battery cells connected in series to each other. The battery 11 includes a positive electrode terminal PB and a negative electrode terminal NB which are connected to a direct-current connector 1a of the power conversion device 1. The positive electrode terminal PB and the negative electrode terminal NB are connected to a positive electrode end and a negative electrode end of the plurality of battery modules connected in series to each other within the battery case.

The first motor 12 generates a rotary driving force (power-running operation) using power which is supplied from the battery 11. The second motor 13 generates generating power using a rotary driving force which is input to a rotary shaft. Here, the second motor 13 is configured to have the rotary dynamic force of an internal-combustion engine transmitted thereto. For example, each of the first motor 12 and the second motor 13 is a three-phase AC brushless DC motor. Three phases are a U-phase, a V-phase, and a W-phase. Each of the first motor 12 and the second motor 13 is an inner rotor type. Each of the motors 12 and 13 includes a rotor having a field permanent magnet and a stator having a three-phase stator winding for generating a rotating magnetic field that rotates the rotor. The three-phase stator winding of the first motor 12 is connected to a first three-phase connector 1b of the power conversion device 1. The three-phase stator winding of the second motor 13 is connected to a second three-phase connector 1c of the power conversion device 1.

<Power Conversion Device>

The power conversion device 1 includes a power module 21, a reactor 22, a capacitor unit 23, a resistor 24, a first current sensor 25, a second current sensor 26, a third current sensor 27, an electronic control unit 28 (MOT GEN ECU), and a gate drive unit 29 (G/D VCU ECU).

The power module 21 includes a first power conversion circuit portion 31, a second power conversion circuit portion 32, and a third power conversion circuit portion 33. The first power conversion circuit portion 31 is connected to the three-phase stator winding of the first motor 12 by the first three-phase connector 1b. The first power conversion circuit portion 31 converts direct-current power which is input from the battery 11 through the third power conversion circuit portion 33 into three-phase AC power. The second power conversion circuit portion 32 is connected to the three-phase stator winding of the second motor 13 by the second three-phase connector 1c. The second power conversion circuit portion 32 converts three-phase AC power which is input from the second motor 13 into direct-current power. The direct-current power converted by the second power conversion circuit portion 32 can be supplied to at least one of the battery 11 and the first power conversion circuit portion 31.

Each of the first power conversion circuit portion 31 and the second power conversion circuit portion 32 includes a bridge circuit formed by a plurality of switching elements which are bridge-connected to each other. For example, the switching element is a transistor such as an insulated gate bipolar transistor (IGBT) or a metal oxide semi-conductor field effect transistor (MOSFET). For example, in the bridge circuit, high side arm and low side arm U-phase transistors UH and UL forming a pair, high side arm and low side arm V-phase transistors VH and VL forming a pair, and high side arm and low side arm W-phase transistors WH and WL forming a pair are bridge-connected to each other. In the present embodiment, in each of the U, V, and W-phases, high side arm and low side arm transistors (for example, U-phase high side arm transistor UH and U-phase low side arm transistor UL) are disposed next to each other in a first direction D1.

Each of the transistors UH, VH, and WH of a high side arm configures a high side arm by its collector being connected to a positive electrode terminal PI. In each phase, each positive electrode terminal PI of a high side arm is connected to a positive electrode bus bar 50p.

Each of the transistors UL, VL, and WL of a low side arm configures a low side arm by its emitter being connected to a negative electrode terminal NI. In each phase, each negative electrode terminal NI of a low side arm is connected to a negative electrode bus bar 50n.

As shown in FIGS. 1 and 2, the emitter of each of the transistors UH, VH, and WH of a high side arm in each phase is connected to the collector of each of the transistors UL, VL, and WL of a low side arm at a connection point TI.

The connection point TI of the first power conversion circuit portion 31 in each phase is connected to a first input and output terminal Q1 by a first bus bar 51. The first input and output terminal Q1 is connected to the first three-phase connector 1b. The connection point TI of the first power conversion circuit portion 31 in each phase is connected to the stator winding of the first motor 12 in each phase through the first bus bar 51, the first input and output terminal Q1, and the first three-phase connector 1b.

The connection point TI of the second power conversion circuit portion 32 in each phase is connected to a second input and output terminal Q2 by a second bus bar 52. The second input and output terminal Q2 is connected to the second three-phase connector 1c. The connection point TI of the second power conversion circuit portion 32 in each phase is connected to the stator winding of the second motor 13 in each phase through the second bus bar 52, the second input and output terminal Q2, and the second three-phase connector 1c. As shown in FIG. 2, the bridge circuit includes a diode which is connected between the collector and the emitter of each of the transistors UH, UL, VH, VL, WH, and WL so as to have a forward direction from the emitter toward the collector.

Each of the first power conversion circuit portion 31 and the second power conversion circuit portion 32 switches between the on-state (electrical conduction)/off-state (cut-off) of a transistor pair in each phase, on the basis of a gate signal that is a switching command which is input from the gate drive unit 29 to the gate of each of the transistors UH, VH, WH, UL, VL, and WL. The first power conversion circuit portion 31 converts direct-current power which is input from the battery 11 through the third power conversion circuit portion 33 into three-phase AC power, and sequentially commutates electrical conduction to the three-phase stator winding of the first motor 12, to thereby allow for electrical conduction of an AC U-phase current, a V-phase current, and a W-phase current to the three-phase stator winding. The second power conversion circuit portion 32 converts three-phase AC power which is output from the three-phase stator winding of the second motor 13 into direct-current power by on (electrical conduction)/off (cut-off) driving of a transistor pair in each phase synchronized with the rotation of the second motor 13.

The third power conversion circuit portion 33 is a voltage control unit (VCU). The third power conversion circuit portion 33 includes switching elements of a high side arm and a low side arm forming a pair. For example, the third power conversion circuit portion 33 includes a first transistor S1 of a high side arm and a second transistor S2 of a low side arm. The first transistor S1 configures a high side arm by its collector being connected to a positive electrode terminal PV. The positive electrode terminal PV of a high side arm is connected to the positive electrode bus bar 50p. The second transistor S2 configures a low side arm by its emitter being connected to a negative electrode terminal NV. The negative electrode terminal NV of a low side arm is connected to the negative electrode bus bar 50n. The emitter of the first transistor S1 of a high side arm is connected to the collector of the second transistor S2 of a low side arm. The third power conversion circuit portion 33 includes a diode which is connected between the collector and the emitter of each of the first transistor S1 and the second transistor S2 so as to have a forward direction from the emitter toward the collector.

A connection point between the first transistor S1 of a high side arm and the second transistor S2 of a low side arm is connected to the reactor 22 by a third bus bar 53. Both ends of the reactor 22 are connected to the connection point between the first transistor S1 and the second transistor S2, and the positive electrode terminal PB of the battery 11. The reactor 22 includes a coil and a temperature sensor that detects the temperature of the coil. The temperature sensor is connected to the electronic control unit 28 by a signal line.

The third power conversion circuit portion 33 switches between the on-state (electrical conduction)/off-state (cut-off) of a transistor pair on the basis of a gate signal that is a switching command which is input from the gate drive unit 29 to the gate of each of the first transistor S1 and the second transistor S2.

The third power conversion circuit portion 33 alternately switches between, during a boost in voltage, a first state where the second transistor S2 is set to be in an on-state (electrical conduction) and the first transistor S1 is set to be in an off-state (cutoff), and a second state where the second transistor S2 is set to be in an off-state (cutoff) and the first transistor S1 is set to be in an on-state (electrical conduction). In the first state, sequentially, a current flows to the positive electrode terminal PB of the battery 11, the reactor 22, the second transistor S2, and the negative electrode terminal NB of the battery 11, the reactor 22 is DC excited, and magnetic energy is accumulated. In the second state, an electromotive voltage (induced voltage) is generated between both ends of the reactor 22 so as to prevent a change in magnetic flux due to a current flowing to the reactor 22 being cut off. An induced voltage caused by the magnetic energy accumulated in the reactor 22 is superimposed on a battery voltage, and thus a boost voltage higher than a voltage between the terminals of the battery 11 is applied between the positive electrode terminal PV and the negative electrode terminal NV of the third power conversion circuit portion 33.

The third power conversion circuit portion 33 alternately switches between the second state and the first state during regeneration. In the second state, sequentially, a current flows to the positive electrode terminal PV of the third power conversion circuit portion 33, the first transistor S1, the reactor 22, and the positive electrode terminal PB of the battery 11, the reactor 22 is DC excited, and magnetic energy is accumulated. In the first state, an electromotive voltage (induced voltage) is generated between both ends of the reactor 22 so as to prevent a change in magnetic flux due to a current flowing to reactor 22 being cut off. An induced voltage caused by the magnetic energy accumulated in the reactor 22 is stepped down, and thus a stepped down voltage lower than a voltage between the positive electrode terminal PV and the negative electrode terminal NV of the third power conversion circuit portion 33 is applied between the positive electrode terminal PB and the negative electrode terminal NB of the battery 11.

The capacitor unit 23 includes a first smoothing capacitor 41, a second smoothing capacitor 42, and a noise filter 43.

The first smoothing capacitor 41 is connected between the positive electrode terminal PB and the negative electrode terminal NB of the battery 11. The first smoothing capacitor 41 smoothes a voltage fluctuation which is generated with the on/off switching operations of the first transistor S1 and the second transistor S2 during the regeneration of the third power conversion circuit portion 33.

The second smoothing capacitor 42 is connected between the positive electrode terminal PI and the negative electrode terminal NI of each of the first power conversion circuit portion 31 and the second power conversion circuit portion 32, and between the positive electrode terminal PV and the negative electrode terminal NV of the third power conversion circuit portion 33. The second smoothing capacitor 42 is connected to a plurality of positive electrode terminal PI and negative electrode terminals NI, and the positive electrode terminal PV and the negative electrode terminal NV through the positive electrode bus bar 50p and the negative electrode bus bar 50n. The second smoothing capacitor 42 smoothes a voltage fluctuation which is generated with the on/off switching operation of each of the transistors UH, UL, VH, VL, WH, and WL of each of the first power conversion circuit portion 31 and the second power conversion circuit portion 32. The second smoothing capacitor 42 smoothes a voltage fluctuation which is generated with the on/off switching operations of the first transistor S1 and the second transistor S2 during a boost in voltage of the third power conversion circuit portion 33.

The noise filter 43 is connected between the positive electrode terminal PI and the negative electrode terminal NI of each of the first power conversion circuit portion 31 and the second power conversion circuit portion 32, and between the positive electrode terminal PV and the negative electrode terminal NV of the third power conversion circuit portion 33. The noise filter 43 includes two capacitors which are connected in series to each other. A connection point between the two capacitors is connected to the body ground or the like of the vehicle 10.

The resistor 24 is connected between the positive electrode terminal PI and the negative electrode terminal NI of each of the first power conversion circuit portion 31 and the second power conversion circuit portion 32, and between the positive electrode terminal PV and the negative electrode terminal NV of the third power conversion circuit portion 33.

The first current sensor 25 is disposed at the first bus bar 51 that connects the connection point TI of the first power conversion circuit portion 31 in each phase and the first input and output terminal Q1, and detects a current of each of the U-phase, the V-phase, and the W-phase. The second current sensor 26 is disposed at the second bus bar 52 that connects the connection point TI of the second power conversion circuit portion 32 in each phase and the second input and output terminal Q2, and detects a current of each of the U-phase, the V-phase, and the W-phase. The third current sensor 27 is disposed at the third bus bar 53 that connects the connection point between the first transistor S1 and the second transistor S2 and the reactor 22, and detects a current flowing to the reactor 22.

Each of the first current sensor 25, the second current sensor 26, and the third current sensor 27 is connected to the electronic control unit 28 by a signal line.

The electronic control unit 28 controls an operation of each of the first motor 12 and the second motor 13. For example, the electronic control unit 28 is a software functional unit that functions by a predetermined program being executed by a processor such as a central processing unit (CPU). The software functional unit is an electronic control unit (ECU) including a processor such as a CPU, a read only memory (ROM) that stores a program, a random access memory (RAM) that temporarily stores data, and an electronic circuit such as a timer. Meanwhile, at least a portion of the electronic control unit 28 may be an integrated circuit such as a large scale integration (LSI). For example, the electronic control unit 28 executes feedback control or the like of a current using a current detection value of the first current sensor 25 and a current target value according to a torque command value for the first motor 12, and generates a control signal which is input to the gate drive unit 29. For example, the electronic control unit 28 executes feedback control or the like of a current using a current detection value of the second current sensor 26 and a current target value according to a regeneration command value for the second motor 13, and generates a control signal which is input to the gate drive unit 29. The control signal is a signal indicating a timing at which on (electrical conduction)/off (cutoff) driving is performed on each of the transistors UH, VH, WH, UL, VL, and WL of each of the first power conversion circuit portion 31 and the second power conversion circuit portion 32. For example, the control signal is a pulse-width modulated signal or the like.

The gate drive unit 29 generates a gate signal for performing actual on (electrical conduction)/off (cutoff) driving on each of the transistors UH, VH, WH, UL, VL, and WL of each of the first power conversion circuit portion 31 and the second power conversion circuit portion 32, on the basis of the control signal which is received from the electronic control unit 28. For example, the gate drive unit 29 executes the amplification, level shift and the like of the control signal, and generates a gate signal.

The gate drive unit 29 generates a gate signal for performing on (electrical conduction)/off (cutoff) driving on each of the first transistor S1 and the second transistor S2 of the third power conversion circuit portion 33. For example, the gate drive unit 29 generates a gate signal having a duty ratio according to a boost voltage command during a boost in voltage of the third power conversion circuit portion 33 or a step down voltage command during the regeneration of the third power conversion circuit portion 33. The duty ratio is a ratio between the first transistor S1 and the second transistor S2.

As shown in FIG. 1, in each of the first power conversion circuit portion 31 and the second power conversion circuit portion 32 of the power module 21, a high side arm switching element and a low side arm switching element corresponding to each of the three phases form element arrays PU1, PV1, PW1, PU2, PV2, and PW2. In each of the first power conversion circuit portion 31 and the second power conversion circuit portion 32, three element arrays PU1, PV1, and PW1 and three element arrays PU2, PV2, and PW2 corresponding to the three phases are respectively disposed side by side in the first direction DE For example, in the first power conversion circuit portion 31, the element array PU1 of the high side arm and low side arm U-phase transistors UH and UL, the element array PV1 of the high side arm and low side arm V-phase transistors VH and VL, and the element array PW1 of the high side arm and low side arm W-phase transistors WH and WL are sequentially disposed side by side in the first direction D1. For example, in the second power conversion circuit portion 32, the element array PU2 of the high side arm and low side arm U-phase transistors UH and UL, the element array PV2 of the high side arm and low side arm V-phase transistors VH and VL, and the element array PW2 of the high side arm and low side arm W-phase transistors WH and WL are sequentially disposed side by side in the first direction D1.

In each of the first power conversion circuit portion 31 and the second power conversion circuit portion 32, a high side arm switching element and a low side arm switching element in the element arrays PU1, PV1, PW1, PU2, PV2, and PW2 corresponding to each of the three phases are disposed side by side in the first direction D1. In each of the high side arm and low side arm U-phase transistors UH and UL, the high side arm and low side arm V-phase transistors VH and VL, and the high side arm and low side arm W-phase transistors WH and WL, the transistor of a high side arm and the transistor of a low side arm are disposed side by side in the first direction D1.

Three element arrays PU1, PV1, and PW1 corresponding to the three phases of the first power conversion circuit portion 31 and three element arrays PU2, PV2, and PW2 corresponding to the three phases of the second power conversion circuit portion 32 are disposed at positions facing each other in a second direction D2 orthogonal to the first direction D1 for each phase. The element array PU1 of the high side arm and low side arm U-phase transistors UH and UL of the first power conversion circuit portion 31 and the element array PU2 of the high side arm and low side arm U-phase transistors UH and UL of the second power conversion circuit portion 32 are disposed opposite to each other in the second direction D2.

The element array PV1 of the high side arm and low side arm V-phase transistors VH and VL of the first power conversion circuit portion 31 and the element array PV2 of the high side arm and low side arm V-phase transistors VH and VL of the second power conversion circuit portion 32 are disposed opposite to each other in the second direction D2. The element array PW1 of the high side arm and low side arm W-phase transistors WH and WL of the first power conversion circuit portion 31 and the element array PW2 of the high side arm and low side arm W-phase transistors WH and WL of the second power conversion circuit portion 32 are disposed opposite to each other in the second direction D2. The positive electrode bus bar 50p and the negative electrode bus bar 50n extending in the first direction D1 are disposed between three element arrays PU1, PV1, and PW1 corresponding to the three phases of the first power conversion circuit portion 31 and three element arrays PU2, PV2, and PW2 corresponding to the three phases of the second power conversion circuit portion 32.

Element arrays PS composed of switching elements of a high side arm and a low side arm of the third power conversion circuit portion 33 are disposed side by side next to the first power conversion circuit portion 31 and the second power conversion circuit portion 32 in the first direction D1. The first transistors S1 of a high side arm of the third power conversion circuit portion 33 are disposed side by side next to the three element arrays PU2, PV2, and PW2 of the second power conversion circuit portion 32 in the first direction D1. The second transistors S2 of a low side arm of the third power conversion circuit portion 33 are disposed side by side next to the three element arrays PU1, PV1, and PW1 of the first power conversion circuit portion 31 in the first direction D1. In the third power conversion circuit portion 33, the first transistor S1 of a high side arm and the second transistor S2 of a low side arm forming a pair are disposed opposite to each other in the second direction D2 across the positive electrode bus bar 50p and the negative electrode bus bar 50n.

Figure 3:
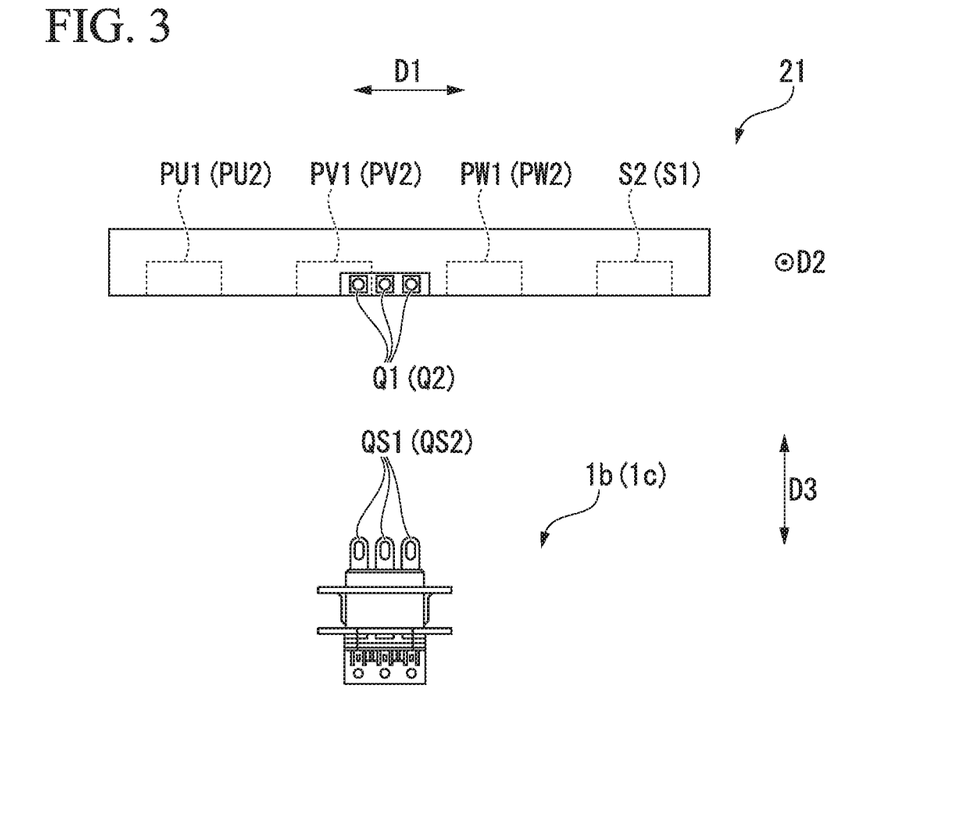
FIG. 3 is a side view schematically illustrating a configuration seen from a second direction after exploding a power module and a first or second three-phase connector of the power conversion device according to the embodiment of the present invention.

FIG. 3 is a side view schematically illustrating a configuration seen from the second direction D2 after exploding the power module 21 and the first or second three-phase connector 1b or 1c of the power conversion device 1 according to the embodiment of the present invention.

As shown in FIGS. 1 and 3, the first input and output terminal Q1 of the first power conversion circuit portion 31 in each phase is extracted from the high side arm switching element side of each of the element arrays PU1, PV1, and PW1 in the first direction D1 to the side opposite to the second power conversion circuit portion 32 in the second direction D2 by the first bus bar 51. Three first input and output terminal Q1 corresponding to the three phases of the first power conversion circuit portion 31 are connected to the first three-phase connector 1b on the outside of the three element arrays PU1, PV1, and PW1 (the side opposite to the second power conversion circuit portion 32 with respect to the first power conversion circuit portion 31) in the second direction D2. The first three-phase connector 1b includes three first connection terminals QS1 which are connected to the three first input and output terminals Q1 corresponding to the three phases of the first power conversion circuit portion 31. The three first connection terminals QS1 are disposed side by side in the first direction D1.

The second input and output terminal Q2 of the second power conversion circuit portion 32 in each phase is extracted from the high side arm switching element side of each of the element arrays PU2, PV2, and PW2 in the first direction D1 to the side opposite to the first power conversion circuit portion 31 in the second direction D2 by the second bus bar 52. Three second input and output terminals Q2 corresponding to the three phases of the second power conversion circuit portion 32 is connected to the second three-phase connector 1c on the outside of the three element arrays PU2, PV2, and PW2 (the side opposite to the first power conversion circuit portion 31 with respect to the second power conversion circuit portion 32) in the second direction D2.

The second three-phase connector 1c includes three second connection terminals QS2 which are connected to the three second input and output terminals Q2 corresponding to the three phases of the second power conversion circuit portion 32. The three second connection terminals QS2 are disposed side by side in the first direction D1.

The first three-phase connector 1b and the second three-phase connector 1c are disposed at positions facing each other across a plurality of element arrays PU1, PV1, PW1, PU2, PV2, and PW2 of the first power conversion circuit portion 31 and the second power conversion circuit portion 32 in the second direction D2.

<Power Unit>

Figure 4:
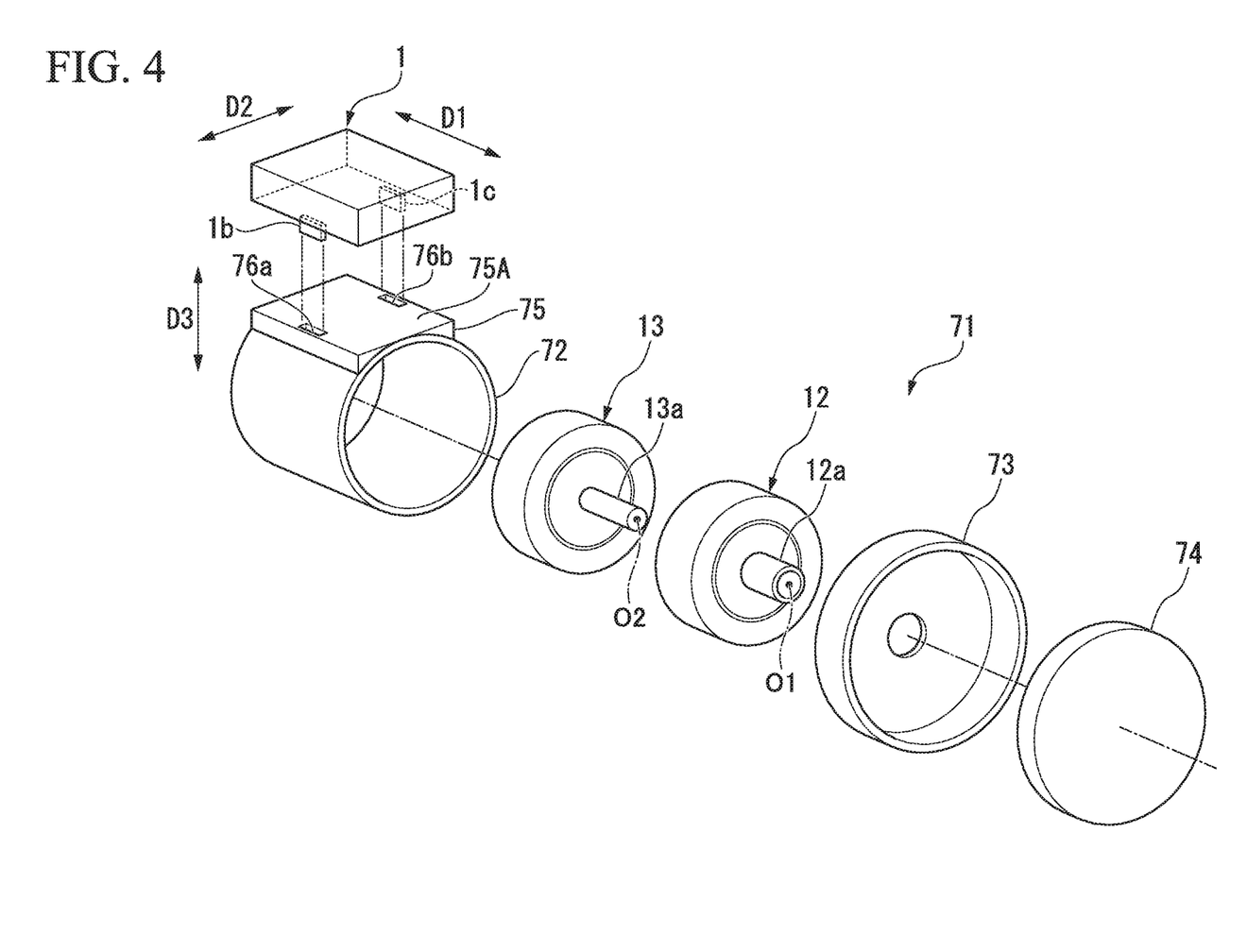
FIG. 4 is an exploded perspective view schematically illustrating a configuration of a portion of the vehicle in which the power conversion device according to the embodiment of the present invention is mounted.
Figure 5:
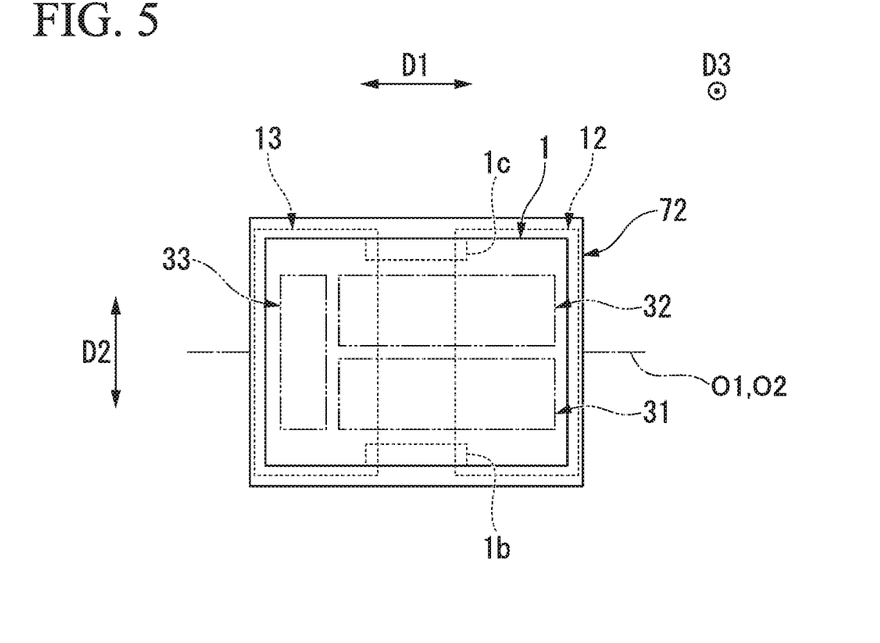
FIG. 5 is a plan view schematically illustrating a configuration when the power conversion device according to the embodiment of the present invention is seen from a third direction.
Figure 6:
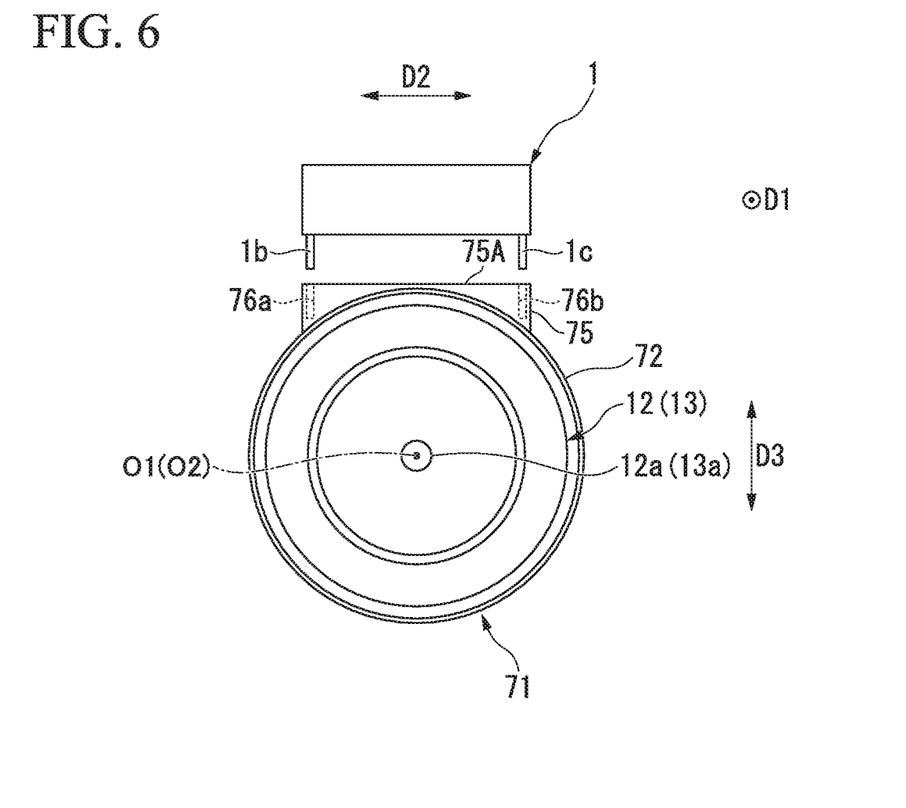
FIG. 6 is a side view schematically illustrating a configuration when the power conversion device according to the embodiment of the present invention is seen from the rotary shaft direction of a power unit.

FIG. 4 is an exploded perspective view schematically illustrating a configuration of a portion of the vehicle 10 in which the power conversion device 1 according to the embodiment of the present invention is mounted. FIG. 5 is a plan view schematically illustrating a configuration when the power conversion device 1 according to the embodiment of the present invention is seen from a third direction D3. FIG. 6 is a side view schematically illustrating a configuration when the power conversion device 1 according to the embodiment of the present invention is seen from the rotary shaft direction of a power unit 71.

As shown in FIGS. 4 and 5, the power unit 71 which is mounted in the vehicle 10 includes the first motor 12 and the second motor 13 which are received in a motor case 72, and a transmission 74 which is received in a transmission case 73. Respective rotary shafts 12a and 13a of the first motor 12 and the second motor 13 mutually become coaxial, and are disposed parallel to the first direction D1. A shaft center O1 of the first motor 12 and a shaft center O2 of the second motor 13 are disposed coaxially along the first direction D1. The motor case 72 and the transmission case 73 are connected to each other side by side in the first direction D1. The respective rotary shafts 12a and 13a of the first motor 12 and the second motor 13 are connected to the transmission 74 through the transmission case 73.

The motor case 72 includes a mount table 75 having a mounting surface 75A for mounting the power conversion device 1. The first motor 12 and the second motor 13 which are received in the motor case 72, and the power module 21 of the power conversion device 1 are disposed so that at least mutual portions overlap each other in plan view in a predetermined radial direction of the first motor 12 and the second motor 13. For example, the predetermined radial direction is a direction which is substantially parallel to the third direction D3 orthogonal to the first direction D1 and the second direction D2. The first power conversion circuit portion 31 and the second power conversion circuit portion 32 are configured such that at least a portion thereof is disposed at a position overlapping at least any of the first motor 12 and the second motor 13 when seen in the predetermined radial direction of the first motor 12 and the second motor 13. For example, at least a portion of a plurality of element arrays PU1, PV1, and PW1 of the first power conversion circuit portion 31 and a plurality of element arrays PU2, PV2, and PW2 of the second power conversion circuit portion 32 is disposed at a position overlapping at least any of the first motor 12 and the second motor 13 when seen from the third direction D3.

The mount table 75 includes first and second case-side connector mounting portions 76a and 76b to which the first and second three-phase connectors 1b and 1c connected to the power conversion device 1 are mounted. The first and second case-side connector mounting portions 76a and 76b are disposed at positions opposite to the second direction D2.

As shown in FIG. 6, the first and second case-side connector mounting portions 76a and 76b of the mount table 75 have the first and second three-phase connectors 1b and 1c disposed in a space occurring between the mounting surface 75A and the outer circumferential portion of each of the first motor 12 and the second motor 13.

Hereinafter, a comparative example of the above-described embodiment will be described.

Figure 7:
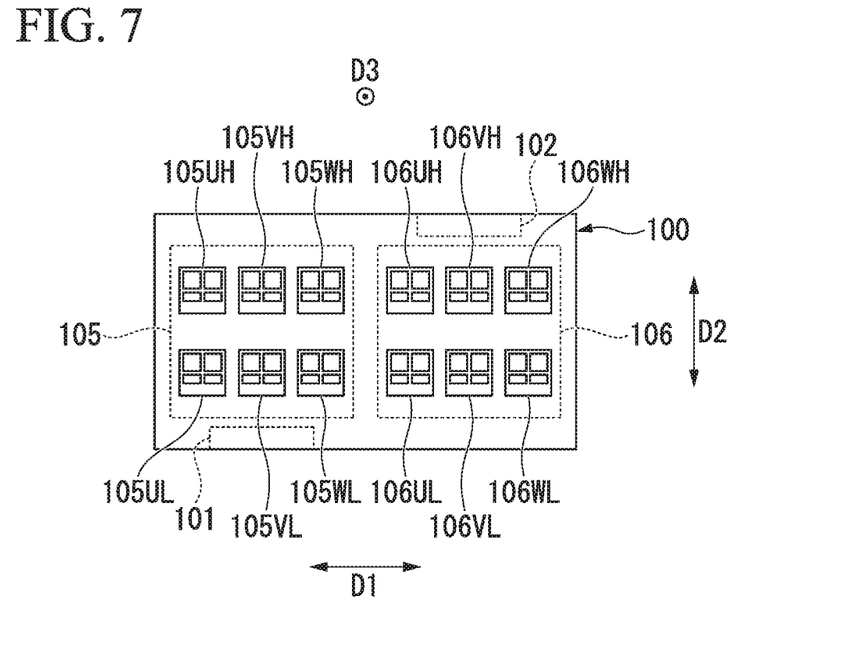
FIG. 7 is a plan view schematically illustrating a configuration when a control unit according to a comparative example of the embodiment of the present invention is seen from the third direction.

FIG. 7 is a plan view schematically illustrating a configuration when a control unit 100 according to a comparative example of the embodiment of the present invention is seen from the third direction D3.

The control unit 100 of the comparative example shown in FIG. 7 includes two three-phase connectors (first three-phase connector 101 and second three-phase connector 102) and two inverter circuits (first inverter circuit 105 and the second inverter circuit 106). The first inverter circuit 105 includes three upper-arm circuit element portions 105UH, 105VH, and 105WH corresponding to three phases, and three lower-arm circuit element portions 105UL, 105VL, and 105WL corresponding to three phases. The second inverter circuit 106 includes three upper-arm circuit element portions 106UH, 106VH, and 106WH corresponding to three phases, and three lower-arm circuit element portions 106UL, 106VL, and 106WL corresponding to three phases.

The first inverter circuit 105 and the second inverter circuit 106 are disposed side by side in the first direction D1. The three upper-arm circuit element portions 105UH, 105VH, and 105WH of the first inverter circuit 105 and the three upper-arm circuit element portions 106UH, 106VH, and 106WH of the second inverter circuit 106 are disposed in a row in the first direction D1. The three lower-arm circuit element portions 105UL, 105VL, and 105WL of the first inverter circuit 105 and the three lower-arm circuit element portions 106UL, 106VL, and 106WL of the second inverter circuit 106 are disposed in a row in the first direction D1. In each phase of each of the first inverter circuit 105 and the second inverter circuit 106, the upper-arm circuit element portion and the lower-arm circuit element portion are disposed opposite to each other in the second direction D2 orthogonal to the first direction D1.

The first three-phase connector 101 is connected to the first inverter circuit 105. The first three-phase connector 101 is disposed on the outside of the three lower-arm circuit element portions 105UL, 105VL, and 105WL (the side opposite to the upper-arm circuit element portions 105UH, 105VH, and 105WH with respect to the lower-arm circuit element portions 105UL, 105VL, and 105WL) in the second direction D2.

The second three-phase connector 102 is connected to the second inverter circuit 106. The second three-phase connector 102 is disposed on the outside of the three upper-arm circuit element portions 106UH, 106VH, and 106WH (the side opposite to the lower-arm circuit element portions 106UL, 106VL, and 106WL with respect to the upper-arm circuit element portions 106UH, 106VH, and 106WH) in the second direction D2.

A mainly different point between the control unit 100 of this comparative example and the power conversion device 1 of the embodiment is that the array direction of the first inverter circuit 105 and the second inverter circuit 106 in the comparative example and the array direction of the first power conversion circuit portion 31 and the second power conversion circuit portion 32 in the embodiment are different from each other.

According to this comparative example, the first three-phase connector 101 is disposed on one side in the second direction D2, and the second three-phase connector 102 is disposed on the other side in the second direction D2. However, the first power conversion circuit portion 31 and the second power conversion circuit portion 32 of the embodiment are lined up in the second direction D2, whereas the first inverter circuit 105 and the second inverter circuit 106 of the comparative example are lined up in the first direction D1. Thereby, the first and second three-phase connectors 1b and 1c of the embodiment are disposed opposite to each other in the second direction D2, whereas the first and second three-phase connectors 101 and 102 of the comparative example are disposed so as to be offset in the first direction D1. In this comparative example, for example, in order to cause the first and second three-phase connectors 101 and 102 to be disposed opposite to each other in the second direction D2, there is a problem in that a bus bar, a cable or the like for connecting each of the inverter circuits 105 and 106 and each of the three-phase connectors 101 and 102 is required to be extended.

As described above, according to the power conversion device 1 of the present embodiment, at least a portion of the first power conversion circuit portion 31 and the second power conversion circuit portion 32 overlaps at least any of the first motor 12 and the second motor 13 when seen in the radial direction of each of the motors 12 and 13. Therefore, for example, as compared with a case where the first power conversion circuit portion 31 and the second power conversion circuit portion 32, and the first motor 12 and the second motor 13 do not overlap each other, it is possible to suppress an increase in the entire size of the power conversion device 1, and the first motor 12 and the second motor 13.

In the present embodiment, the three first connection terminals QS1 and the three second connection terminals QS2 are disposed side by side parallel to the respective shaft centers O1 and O2 of the motors 12 and 13, on one side and the other side in the second direction D2 orthogonal to the respective shaft centers O1 and O2 of the motors 12 and 13. Therefore, for example, as compared with a case where the three first connection terminals QS1 and the three second connection terminals QS2 are disposed side by side in another direction such as a direction intersecting the respective shaft centers O1 and O2 of the motors 12 and 13, it is possible to improve space efficiency. In addition, for example, as compared with a case where the three first connection terminals QS1 and the three second connection terminals QS2 are disposed side by side in a row parallel to the respective shaft centers O1 and O2 of the motors 12 and 13, on only one side, the other side or the like in the second direction D2, it is possible to improve space efficiency.

Further, the first and second three-phase connectors 1b and 1c connected to the respective input and output terminals Q1 and Q2 of the first power conversion circuit portion 31 and the second power conversion circuit portion 32 can be efficiently disposed in a space occurring between the mounting surface 75A of the motor case 72 and the outer circumferential portion of each of the motors 12 and 13. Thereby, it is possible to suppress an increase in the entire size of the power conversion device 1, and the first and second motors 12 and 13.

In the present embodiment, each of the element arrays PU1, PV1, and PW1 of the first power conversion circuit portion 31 and each of the element arrays PU2, PV2, and PW2 of the second power conversion circuit portion 32 are disposed opposite to each other in the second direction D2. Therefore, while suppressing an increase in the length of each of the bus bars 51 and 52 connected to each of the input and output terminals Q1 and Q2, at least portions of the respective input and output terminals Q1 and Q2 can be disposed so as to overlap each other when seen from the second direction D2. Therefore, in a case where the power conversion device 1 is mounted on the mount table 75 of the motor case 72, it is possible to suppress a decrease in space efficiency. It is possible to prevent a space required for avoiding interference between the power conversion device 1 and each of the motors 12 and 13 or the motor case 72 from increasing, and to suppress an increase in the entire size of the power conversion device 1 and each of the motors 12 and 13.

In the present embodiment, while preventing the positive electrode bus bar 50*p* and the negative electrode bus bar 50*n* from lengthening, it is possible to communize the positive electrode bus bar 50*p* and the negative electrode bus bar 50*n* in a plurality of element arrays PU1, PV1, PW1, PU2, PV2, and PW2 of the first power conversion circuit portion 31 and the second power conversion circuit portion 32. Thereby, while suppressing an increase in the size of the power conversion device 1, it is possible to suppress an increase in the inductance of the positive electrode bus bar 50*p* and the negative electrode bus bar 50*n*.

In the present embodiment, the three element arrays PU1, PV1, and PW1 of the first power conversion circuit portion 31 and the three element arrays PU2, PV2, and PW2 of the second power conversion circuit portion 32 are respectively disposed side by side parallel to the respective shaft centers O1 and O2 of the motors 12 and 13. Therefore, for example, as compared with a case where these element arrays are disposed side by side in another direction, it is possible to improve space efficiency.

In the present embodiment, the first transistor S1 and the second transistor S2 of the third power conversion circuit portion 33 functioning as a voltage converter are disposed next to the first power conversion circuit portion 31 and the second power conversion circuit portion 32. Therefore, it is possible to suppress an increase in the entire size of the power conversion device 1 and the first and second motors 12 and 13.

Hereinafter, a modification example of the embodiment will be described.

In the above-described embodiment, in the three element arrays PU1, PV1, and PW1 of the first power conversion circuit portion 31 and the three element arrays PU2, PV2, and PW2 of the second power conversion circuit portion 32, the relative positions of the first transistor S1 and the second transistor S2 of the third power conversion circuit portion 33 may be reversed.

For example, the first transistors S1 of a high side arm of the third power conversion circuit portion 33 may be disposed side by side next to the three element arrays PU1, PV1, and PW1 of the first power conversion circuit portion 31 in the first direction D1. The second transistors S2 of a low side arm of the third power conversion circuit portion 33 may be disposed side by side next to the three element arrays PU2, PV2, and PW2 of the second power conversion circuit portion 32 in the first direction D1.

Meanwhile, in the above-described embodiment, the respective input and output terminals Q1 and Q2 of the first power conversion circuit portion 31 and the second power conversion circuit portion 32 are assumed to be extracted from the high side arm switching element side of each of the element arrays PU1, PV1, and PW1, PU2, PV2, PW2 in the first direction D1, but there is no limitation thereto.

Each of the input and output terminals Q1 and Q2 may be extracted from the low side arm switching element side of each of the element arrays PU1, PV1, and PW1, PU2, PV2, PW2 in the first direction D1, and may be extracted from between the high side arm switching element and the low side arm switching element.

Meanwhile, in the above-described embodiment, the power conversion device 1 is assumed to be mounted in the vehicle 10, but may be mounted in other instruments without being limited thereto.

The embodiments of the present invention have been presented by way of example only, and are not intended to limit the scope of the invention. Indeed, these embodiments described herein may be embodied in a variety of other forms; furthermore, various omissions, substitutions and changes in the form of the embodiments described herein may be made without departing from the spirit of the inventions. The appended claims and their equivalents are intended to cover such forms or modifications as would fall within the scope and spirit of the invention.

What is claimed is:

1. A power conversion device comprising:
    a first power conversion circuit and a second power conversion circuit that deliver power to and/or from a first motor and a second motor, respectively, of which shaft centers are disposed along a first direction;
    a plurality of first connection terminals that connect the first power conversion circuit and the first motor; and
    a plurality of second connection terminals that connect the second power conversion circuit and the second motor,
    wherein the first power conversion circuit and the second power conversion circuit are configured such that, when seen in radial directions of the first motor and the second motor, at least a portion of the first power conversion circuit and the second power conversion circuit is disposed at a position overlapping at least any of the first motor and the second motor,
    when seen in the radial directions of the first motor and the second motor, the plurality of first connection terminals are disposed side by side along the first direction on a first side, and
    when seen in the radial directions of the first motor and the second motor, the plurality of second connection terminals are disposed side by side along the first direction on a second side, wherein the first side and the second side are opposite sides of a second direction with respect to the shaft centers, and wherein the first direction and the second direction are perpendicular.

2. The power conversion device according to claim 1,
    wherein the first power conversion circuit includes a plurality of first element arrays in which element arrays composed of a high side arm element and a low side arm element delivering power to and/or from the first motor are lined up in the first direction according to a plurality of phases of the first motor,
    the second power conversion circuit includes a plurality of second element arrays in which element arrays composed of high side arm elements and low side arm elements delivering power to and/or from the second motor are lined up in the first direction according to a plurality of phases of the second motor,
    the plurality of first element arrays and the plurality of second element arrays are disposed at positions facing each other in the second direction,
    input and output terminals of the plurality of first element arrays are extracted to a side opposite to the plurality of second element arrays in the second direction, and
    input and output terminals of the plurality of second element arrays are extracted to a side opposite to the plurality of first element arrays in the second direction.

3. The power conversion device according to claim 1, further comprising:
    a capacitor connected to positive electrode terminals and negative electrode terminals of the plurality of first element arrays and the plurality of second element arrays;
    a positive electrode bus bar which extends in the first direction between the plurality of first element arrays and the plurality of second element arrays and to which the positive electrode terminals of the plurality of first element arrays and the plurality of second element arrays are connected; and a negative electrode bus bar which extends in the first direction between the plurality of first element arrays and the plurality of second element arrays and to which the negative electrode terminals of the plurality of first element arrays and the plurality of second element arrays are connected.

4. The power conversion device according to claim 1, further comprising a voltage converter which is electrically connected to at least any of the plurality of first element arrays and the plurality of second element arrays, wherein first elements of high side arm elements and low side arm elements configuring the voltage converter are disposed side by side next to the plurality of first element arrays in the first direction, and second elements of high side arm elements and low side arm elements configuring the voltage converter are disposed side by side next to the plurality of second element arrays in the first direction.

\* \* \* \* \*